(12) United States Patent
Smith

(10) Patent No.: US 9,788,559 B2
(45) Date of Patent: Oct. 17, 2017

(54) METHOD OF PREPARATION OF FOOD PRODUCT WITH EDIBLE IMAGES

(75) Inventor: Donald J. Smith, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 2127 days.

(21) Appl. No.: 11/761,031

(22) Filed: Jun. 11, 2007

(65) Prior Publication Data

US 2007/0292573 A1 Dec. 20, 2007

Related U.S. Application Data

(60) Provisional application No. 60/804,965, filed on Jun. 16, 2006.

(51) Int. Cl.
*A23G 3/34* (2006.01)

(52) U.S. Cl.
CPC .................................. *A23G 3/0097* (2013.01)

(58) Field of Classification Search
CPC .................................................... A23G 3/0097
See application file for complete search history.

(56) References Cited

U.S. PATENT DOCUMENTS

| | | | | |
|---|---|---|---|---|
| 4,394,693 | A | * | 7/1983 | Shirley ........................ 358/1.2 |
| 5,723,163 | A | * | 3/1998 | Zimmermann et al. ...... 426/106 |
| 5,795,395 | A | * | 8/1998 | Ben-Matitayhu ........ A23G 3/20 |
| | | | | 118/13 |
| 6,153,233 | A | * | 11/2000 | Gordon et al. .................. 426/90 |
| 6,499,842 | B1 | * | 12/2002 | Kofman et al. .............. 347/105 |
| 6,698,877 | B2 | * | 3/2004 | Urlaub et al. ................ 347/103 |
| 7,435,439 | B2 | | 10/2008 | Morgan et al. |
| 7,933,443 | B2 | | 4/2011 | Wen et al. |
| 2002/0114878 | A1 | * | 8/2002 | Ben-Yoseph et al. ........ 426/660 |
| 2004/0086603 | A1 | * | 5/2004 | Shastry et al. ................ 426/104 |
| 2005/0088693 | A1 | * | 4/2005 | Schnoebelen et al. ...... 358/1.18 |
| 2005/0157148 | A1 | * | 7/2005 | Baker et al. .................. 347/106 |

\* cited by examiner

*Primary Examiner* — Jenna A Watts
(74) *Attorney, Agent, or Firm* — Diederiks & Whitelaw, PLC; Gregory P. Kaihoi

(57) ABSTRACT

A topical high resolution image of edible ink and having a resolution of at least 100 dots per inch is applied to a top major surface of a length of food (14) in the form of a thin fruit based paste or confection slurry by a digital imaging printer (130). The length of food (14) is at a temperature of at least about 75° C. at the time of application. During application, the food (14) is supported upon a moveable platform (136) mounted by parallelogram links (138) and which is moved parallel to the digital imaging printer (130) according to a condition of the top major surface upon which the topical high resolution image is applied and detected by detecting provisions (144).

26 Claims, 2 Drawing Sheets

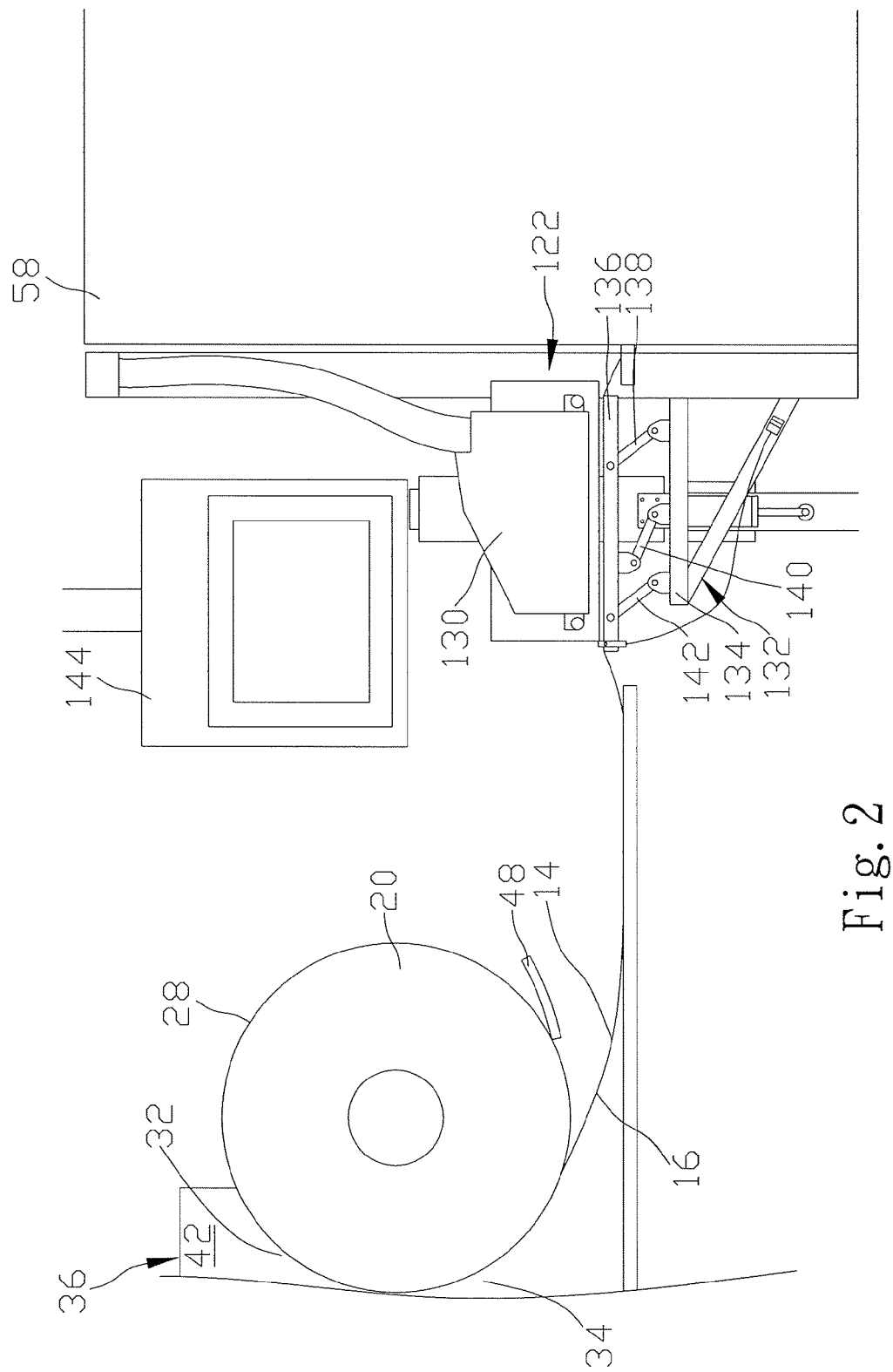

METHOD OF PREPARATION OF FOOD PRODUCT WITH EDIBLE IMAGES

CROSS-REFERENCE TO RELATED APPLICATIONS

This application claims the benefit of priority under 35 U.S.C. 119(e)(1) of a provisional patent application Ser. No. 60/804,965, filed Jun. 16, 2006, which is incorporated herein by reference in its entirety.

BACKGROUND OF THE INVENTION

The present invention relates to food products and to their apparatus for and methods of preparation. More particularly, the present invention relates to intermediate moisture food products such as dried fruit pastes or fruit flavored confections and to their apparatus for and methods of preparation.

Wholesome snacks prepared from sweetened intermediate moisture shelf stable fruit or "fruit snacks" herein have expanded their popularity as food items. These dried fruit products are especially popular with children, particularly as snack or convenience foods. Their popularity has created a highly competitive marketplace. To appeal to children, the primary consumer of fruit snacks, manufacturers must introduce frequent changes to these products. New shapes, colors, textures and flavors are all avenues employed to successfully market these products. To create unique fruit snack shapes, some manufacturers have changed their products to resemble popular characters from movies, television shows, cartoons, etc. To fully appreciate the need for new fruit snack shapes, it is important to understand the wide variety of fruit snacks currently available.

Broadly, fruit snacks are prepared from wet mixtures of the various fruit materials, added ingredients and extra water that are cooked and worked at elevated temperatures and then dried to desired moisture contents to form hot plastic paste or fluid formable fruit masses. The formable fruit masses are then formed into articles of desired shapes and sizes.

Fruit snack compositions are sold in various physical forms and shapes such as: 1) in rolled sheet form; 2) in rolled strip form; 3) in string form mounted on a U-board; 4) soft center filled pieces, and 5) in gelled bite size pieces of various shapes or in gelled bite size piece forms prepared by starch molding. The products are typically packaged in a moisture impermeable container such as a flexible laminated film pouch fabricated to include a moisture barrier layer.

A particularly popular fruit snack available in rolled sheet form is sold under the FRUIT ROLL-UPS brand. Popular products in rolled strip form are sold under the FRUIT BY THE FOOT brand (see for example, commonly assigned U.S. Pat. No. 5,455,053 entitled "Rolled Food Item" issued Oct. 3, 1995). Food products in string form mounted on a U-board were sold under the STRING THING® mark. While other products in bite size pieces of various shapes are sold under various brands. (See, for example, commonly assigned U.S. Pat. No. 5,942,268 entitled "Embossed Shape Food Item" issued Aug. 24, 1999 to Zimmermann et al.). Soft center filled pieces products are described in U.S. Pat. No. 4,853,236 entitled "Dual Textured Food Piece Of Enhanced Stability Using An Oil In Water EMULSION" (issued Mar. 18, 1988 to Langler et al.) while apparatus and fabrication methods therefor are described in U.S. Pat. No. 5,208,059 entitled "Dual Textured Food Piece Fabrication Apparatus" (issued Jun. 10, 1992 to Dubowik et al.).

In other variations, all or a portion of the fruit material is substituted with pure sugars to provide confections. Such low fruit, high sugar formulations can be flavored with fruit flavors and/or other flavors. Within this general similarity, however, the particular methods of preparation, product formulations and apparatus used to prepare particular products vary considerably. Moreover, such variations are highly interdependent. Formulations and method steps suitable for one product form might or might not be suitable for another product form. Also, such products can be fortified with vitamins and minerals, especially calcium for growing children.

The variety of fruit snack shapes including applying character attributes introduce an element of fun or fantasy to the eating experience described as play value. Play value as it relates to fruit snacks is the ability to manipulate a product in a fun or amusing manner. In its more imaginative form, play value entails shaping or coloring a product to represent an unusual object that relies upon the child to discover a use or method to disassemble the product before consumption. The more discoveries built into a fruit snack, the greater the amusement and appreciation by children. The interaction of two or more food pieces is especially amusing when disassembly can easily be achieved and it yields an unexpected result.

One manner of creating play value is taught in U.S. Pat. No. 6,153,233, which has achieved considerable market success. In the '233 patent, a low resolution image (using edible ink) is applied to the support material. Thereafter, hot fruit material is applied to the support material to overlay upon the printed image. The image transfers from the support material to stick to the inner surface of the fruit layer. When the cooled fruit layer is removed from the support material for consumption, the image is on the fruit. The image can be transferred from the fruit layer to a wet surface, e.g., a child's tongue, hence the colloquial name of "Tongue Tattoo" technology.

While useful, for an event, typically roll stock with printed images are prepared/printed in advance and stored in inventory. Often, excessive roll stock or insufficient rollstock is made for a promotional event. The extra rollstock is then discarded as waste.

The present invention is directed toward those articles and improvements in the apparatus for and methods of preparation of the hot plastic paste or fluid formable masses such as fruit pastes and their formation into various suitable shaped and sized pieces. In view of the current state of the intermediate moisture food art, there is a continuing need for new and improved formulations and methods for preparing intermediate moisture shaped food products. As an example, in the current invention, the special roll stock of U.S. Pat. No. 6,153,233 is no longer needed. The image is printed directly onto the outer surface of the fruit layer. Extra or insufficient rollstock problems are avoided at great savings to inventory costs.

BRIEF SUMMARY OF THE INVENTION

The present invention solves these problems and needs in the field of food products and particular food products and in most preferred forms of dried fruit pastes and fruit flavored confections, by providing, in preferred aspects, a topical high resolution image of a resolution of at least 100 dots per inch in at least a first direction applied to a length of food in the form of a thin fruit based paste or confection slurry which has a temperature of at least about 75° C. (170° F.) at the time of application of the topical high resolution image. In preferred forms, the topical high resolution image has a higher resolution in a second, nonparallel direction and preferably 200 dots per inch perpendicular to the first direction. In another preferred form, the length of food is supported upon a continuous support material at the time of application of the topical high resolution image.

In other aspects, a topical high resolution image is applied to a length of food by an ink jet printer, with the length of food at the time of application of the topical high resolution image being supported upon a moveable platform which moves relative to the printer head of the ink jet printer according to a detected condition of the top major surface of the length of food. In preferred forms, the moveable platform is mounted by a parallelogram linkage which is pivoted to move the moveable platform between multiple positions parallel to the printer head.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 2 shows a partial, enlarged side view of the apparatus of FIG. 1.

Figure 1:
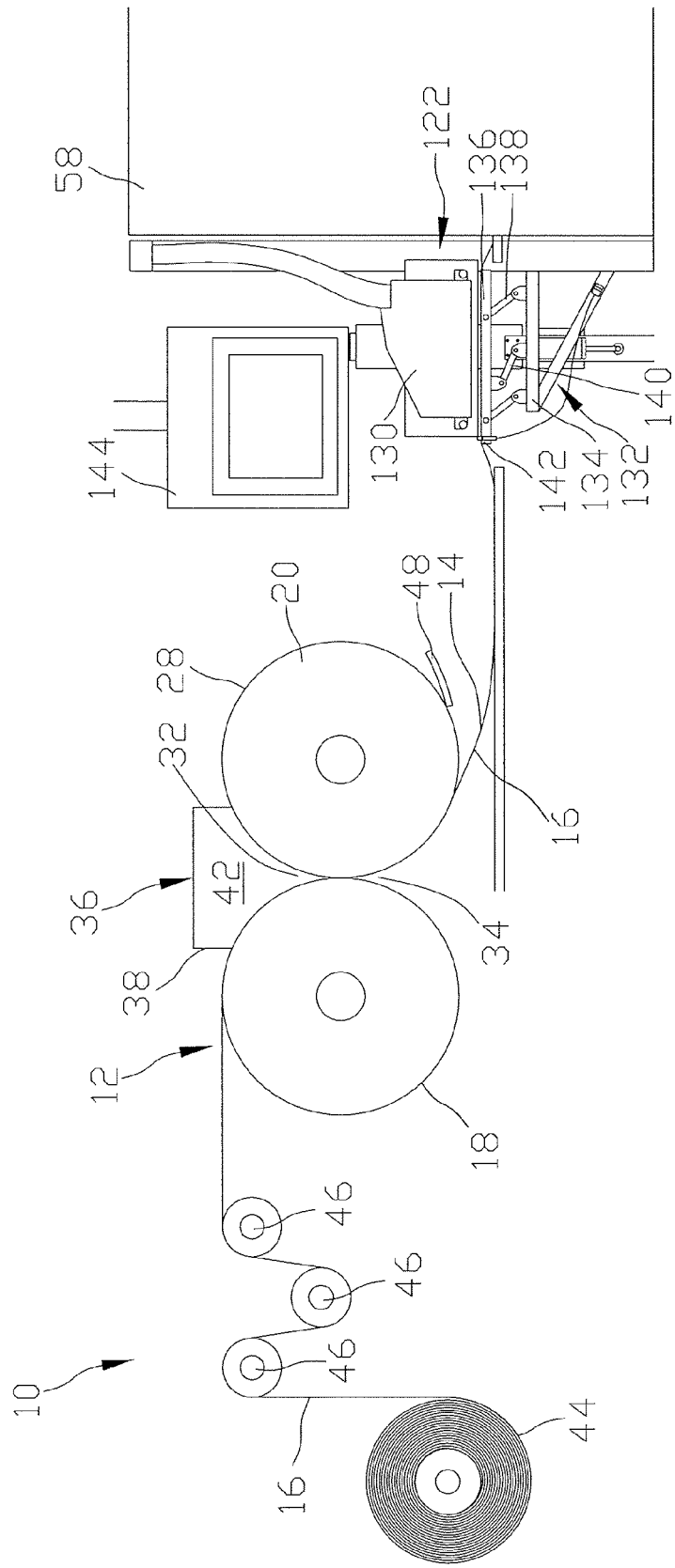
FIG. 1 shows a diagrammatic side view of an apparatus utilizing food fabrication methods according to the preferred teachings of the present invention.

The figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the figures of the drawings, the same numerals designate the same or similar parts. Furthermore, when the terms "first", "second", "lower", "upper", "end", "axial", "longitudinal", "width", "height", and similar terms are used herein, it should be understood that these terms have reference only to the structure shown in the drawings as it would appear to a person viewing the drawings and are utilized only to facilitate describing the preferred embodiments.

DESCRIPTION OF THE PREFERRED EMBODIMENTS

The present invention relates to food products and to their apparatus for and methods of preparation. More particularly, the present invention relates to intermediate moisture food products such as dried fruit pastes or fruit flavored confections and to apparatus for and methods of their preparation.

Throughout the specification and claims, percentages are by weight and temperatures in degrees Centigrade unless otherwise indicated. Each of the referenced patents or patent applications are hereby incorporated by reference.

Apparatus utilizing the present methods for fabricating a food item, especially a dehydrated fruit puree, on a continuous strip of support material, with the food and support material being rolled to produce the food item, according to the preferred teachings of the present invention is shown in the drawings and generally designated 10. In the most preferred embodiments of the present invention, apparatus 10 is an improvement of the type shown and described in U.S. Pat. Nos. 5,205,106; 5,284,667; 5,455,053; 5,723,163 and 6,153,233. For purpose of explanation of the basic teachings of the present invention, the same numerals designate the same or similar parts in the present figure and the figures of U.S. Pat. Nos. 5,205,106; 5,284,667; 5,455,053; 5,723,163 and 6,153,233. The description of the common numerals and apparatus 10 may be found herein and in U.S. Pat. Nos. 5,205,106; 5,284,667; 5,455,053; 5,723,163 and 6,153,233.

Referring to the drawings in detail, apparatus 10 includes provisions for forming a length of food having a shape and an area shown in the most preferred form of a sheeter 12 for continuously forming one or more strips or continuous ribbons of food 14 of a thinness requiring external support upon a continuous web or sheet of support material 16. In the preferred form where support material 16 and food 14 supported thereon are intended to be rolled into a coil or roll to form a rolled food item, food 14 has a thickness of about 0.035 inch (0.89 mm) whereas when food 14 is intended to be held by support material 16 of a generally rigid material intended to support food 14 in a generally planar condition, food 14 can have greater thickness in the range of 0.125 to 0.25 inch (3 to 6 mm). In the preferred form, food 14 is formed of a base material preferably thermoplastic, optionally gelling agents (pectin, starch, carrageenan, etc.), and sweeteners (sucrose, corn derivatives, sugar alcohols or other low or no calorie sweeteners). Most preferably, food 14 is a sweetened dehydrated fruit-based material typically referred to in the art as fruit leather which can be derived from fruit purees or juices and has a water activity ("$A_w$") of about 0.4 to about 0.7. Similarly, food 14 can be derived from vegetable-based materials. In the most preferred form, food 14 is of the same type as utilized in the first, solid or "hard" portion or region of the dual textured food piece described in U.S. Pat. No. 4,847,098 issued Jul. 11, 1989 to J. E. Langler and in U.S. Pat. No. 4,853,236 issued Aug. 1, 1989 to J. E. Langler, each entitled "Dual Textured Food Piece of Enhanced Stability. Fruit Snack products of this type have long been sold under the FRUIT ROLL-UPS and FRUIT BY THE FOOT marks by General Mills, Inc.

Support material 16 may be formed of any suitable, nonedible material of a flexibility to pass through sheeter 12 and which has the necessary strength to support food 14 without tearing and which allows food 14 to be easily separated therefrom for consumption. In one preferred form, support material 16 is without bulkiness to allow rolling of food 14 and support material 16 into a compact food piece such as formed from silicon parchment paper. Where food 14 is intended to be supported in a generally planar condition, support material 16 can be formed of generally rigid material such as coated paperboard. However, support material 16 can be formed of other material according to the teachings of the present invention including but not limited to polymers such as parchment paper, polyester, cellophane, glassine or wax papers, foil or the like. In certain embodiments, support material 16 can include a release agent (e.g., edible silicone or oil) to facilitate removal of food 14 from the support material 16.

Sheeter 12 generally includes first and second press rollers 18 and 20. In the preferred form, roller 20 is heated by any suitable manner, not shown, such as by steam, to a temperature corresponding to the initial temperature of food 14 and in the preferred form to at least about 170° F. (75° C.). Although not shown, the periphery of roller 18 can be grooved and specifically includes a plurality of spaced, parallel, circular, circumferential bands or lands separating, forming and defining one or more annular depressions or grooves (not shown) around the periphery of roller 18. The spacing between the lands or in other words the width of the depression(s) or groove(s) is generally equal to the desired width of the strips of food 14 and the height of the lands or in other words the depth of the depression(s) or groove(s) is generally equal to the desired thickness of the strips of food 14. If multiple lands are provided, the width of the lands between depressions or grooves is generally equal to the desired spacing between the strips of food 14 which in the preferred form is in the order of one-eighth inch (one-third centimeter). The bottoms of the grooves are cylindrical in configuration and are relatively smooth.

Roller 20 includes a cylindrical periphery 28 which is relatively smooth. Rollers 18 and 20 are rotatably mounted in an abutting relation, with periphery 28 of roller 20 engaging and rolling upon the lands of roller 18 along an abutment nip. In the most preferred form, rollers 18 and 20 are generally cylindrical and of equal diameters. Rollers 18 and 20 are rotated in opposite rotational directions to define an upper, mating side 32 and a lower, exit side 34. To allow cleaning, roller 20 may be slideably mounted relative to roller 18 to allow separation of roller 20 from roller 18.

Food 14 heated to a temperature to become flowable or pumpable is filled into upper mating side 32, with a containment bin or saddle 36 being provided complementary to and for holding food 14 above and evenly feeding material to and within mating side 32. In the preferred form, bin or saddle 36 includes first and second cross bars 38 extending axially across and engaging rollers 18 and 20, respectively. Bin 36 further includes end pieces 42 extending radially between and engaging the peripheries of rollers 18 and 20 and between cross bars 38. In the most preferred form, cross bars 38 extend generally parallel to and end pieces 42 extend generally perpendicular to the rotational axes of rollers 18 and 20. Food 14 is then pumped into bin 36 where it flows by gravity to rollers 18 and 20. However, saddle 36 can have other forms, including but not limited to of the construction of U.S. Pat. No. 5,752,364.

Support material 16 typically is supplied from a roll 44 and after extending around the customary tension rollers 46 is threaded to extend under cross bar 38 of saddle 36 engaging roller 18, over the lands and grooves of the periphery of roller 18 located within bin 36 and mating side 32, and to extend between the nip of rollers 18 and 20 into exit side 34. Food 14 is initially located in mating side 32 intermediate support material 16 and second roller 20. In exit side 34, support material 16 is pulled typically by vacuum conveyors downstream from strip sheeter 12 to extend under periphery 28 of roller 20 within exit side 34 and then extend with a small amount of tension generally tangentially therefrom.

It can be appreciated that as food 14 and support material 16 are pulled between the abutment nip between rollers 18 and 20 by the rotation of rollers 18 and 20, food 14 and support material 16 advancing between rollers 18 and 20 will be compressed into the grooves such that food 14 will be deposited in continuous, thin strip(s) upon support material 16, with the number, width and height of the strips of food 14 corresponding to the number, width and depth of the grooves and the spacing between the strips of food 14 corresponding to the width of the bands or lands between the grooves.

As food 14 is hot and may have a tackiness to stick or adhere to roller 20, a scraper 48 is provided to scrape food 14 which may adhere to roller 20. In the most preferred form, scraper 48 has a straight leading edge which flushly engages periphery 28 of roller 20. Scraper 48 is canted 15° to 30° from the horizontal and is arranged to engage roller 20 and extend generally tangentially therefrom at a position slightly past the lowermost point of roller 20 on the side opposite to roller 18. Scraper 48 in the preferred form is formed of hardened steel which is not susceptible to wear from the continuous engagement with roller 20, with roller 20 also being heated which may soften other materials resulting in wear. Scraper 48 can further include a thin anti-stick coating such as TEFLON™ (the brand name of the polymer polytetrafluoroethylene (PTFE)). Thus, in operation, scraper 48 mechanically scrapes any food 14 off roller 20 which is then pushed onto scraper 48. Because of its non-wear characteristics, scraper 48 can be relatively thin to maximize removal of food 14 from and cleaning of roller 20. Further, due to its anti-stick coating, food 14 removed by scraper 48 will tend to fall by gravity when it travels upon scraper 48 and specifically does not tend to adhere or stick to scraper 48. If food 14 were to stick to scraper 48, food 14 would tend to bunch up and fall as the bunches grew to a size which would fall by gravity and not remain in strips on support material 16 as desired in the present invention.

It can be appreciated that support material 16 separates food 14 from roller 18 and should prevent food 14 from adhering thereto. However, if a problem should arise, such as food which could flow around the ends of support material 16 or through breaks or tears in support material 16, a suitable scraper can be provided for roller 18 also.

After strip sheeter 12, the sheet of support material 16 having strip(s) of food 14 thereon are cooled. In one variation, an elongated conveyor is provided to provide sufficiently residence time to allow the food 14 to cool by ambient cooling. Conveniently to reduce the amount of floor space required for commercial production, apparatus 10 can, and in preferred form does, include and the sheet of support material 16 having strip(s) of food 14 thereon are passed through a cooling tunnel 58. Cooling tunnel 58 is provided with forced chilled air typically cooled to an air temperature in the range of 70° to 80° F. (20° to 27° C.) and support material 16 and strip(s) of food 14 remain in cooling tunnel 58 a sufficient time to cool to about 70° to 80° F. (20° to 27° C.). Support material 16 can be supported within cooling tunnel 58 on a stationary platform or on a moving platform such as a conveyor belt.

After cooling tunnel 58, support material 16 having strips of food 14 is passed onto a conveyor. The strips of food 14 can then be further processed at this time at optional stations such as, but not limited to by embossing, cutting, rolling, and, if rolled, applying some form of roll retention mechanism (see for example, U.S. Pat. No. 6,874,296 "Labelless, Rolled Food Item And Its Fabrication issued Apr. 5, 2005 to Bachand, et al. that discloses use of water spray on the trailing end of the strip for momentary adhesion or U.S. Pat. No. 5,455,053 "Rolled Food Item" issued Oct. 3, 1995 to Zimmermann et al. that discloses a technique to prevent undesired unrolling employing a label extending over the trailing edge of the support material) and packaging such as in a pouch fabricated from a moisture barrier flexible packaging film.

Apparatus 10 according to the teachings of the present invention includes at least a first applicator 122 for providing an edible high resolution image to food 14 after being deposited on support material 16 by sheeter 12, i.e., on a top major surface rather than on an opposed bottom major surface, and preferably prior to cooling tunnel 58. In a preferred form, the edible high resolution image applied to the top major surface of the length of food 14 is transferable from the length of food 14 to a moist surface. In the most preferred form, applicator 122 generally includes a digital imaging printer 130 (e.g., especially an ink jet printer (e.g., thermal bubble jet, piezoelectric drop on demand, continuous ink jet) which in the preferred form is of a conventional type. Specifically, in the most preferred form, printer 130 is a "Merlin 2" printing head of the Spectra Printing Division of Dimatix, Inc. located in Lebanon, N.H. However, it can be appreciated that printer 130 can be of a variety of types and forms which applies images in the form of letters or graphics created by edible inks on food 14.

The image can comprise one or more text, graphic, or combinations thereof. As used herein, "text" means one or more alpha-numeric symbols regardless of language or alphabet, (e.g., Latin, Greek, Cyrillic, Hebrew, Chinese, Arabic, etc.). Text can include letters, numbers, words, and combinations thereof. As used herein, "graphic" means pictorial representation. For instance, the graphic can include objects, symbols, scenes, people, animals, toys, trade marks, or characters (especially licensed equity cartoon characters from popular cartoons or movies). Suitable characters can include cartoon characters and licensed characters, as well as characters associated with popular personalities in the media, advertising, or well known in the particular culture caricatures, historic events, and photographs. The image can be single-color or multi-color. The image can be provided by edible inks.

Furthermore, images can be in the form of full or partial words, numbers, clues, hints, jokes, revelations, trivia quizzes, photographs, pictures, puzzles, stories, games, or sequence of events (e.g., a picture story). For example, the image can comprise the question portion of a trivia quiz or question. In one embodiment, the image depicts a piece of a partial picture suitable for forming or playing a jig-saw puzzle or other pattern.

The image can cover part or all of the visual portion of the edible substrate or food. In addition, the image can include one or more images disposed upon said edible substrate or food.

In a preferred variation, the image is a color image although the image can be printed in black ink. The image can also be of the same color as the food although of a different shade or hue. In preferred variations, the image is a full color image. Conveniently, such full color images can be provided by a printer including a three color system (e.g., cyan, magenta, yellow) as well as black. Other color systems include a four color system (in addition to black) and are contemplated for use herein. In a preferred form, printer 130 could include first and second printer heads in sequence and each applying an individually colored edible ink. As an example, the first printer head could apply an edible ink selected from the three color system (e.g., cyan, magenta, yellow) as well as black, whereas the second printer head could apply a second color edible ink. Printer 130 is mounted such that food 14 is located intermediate printer 130 and support material 16 and intermediate sheeter 12 and cooling tunnel 58, and in the most preferred form is fixed relative to sheeter 12 and cooling tunnel 58 in operation. However, printer 130 could be movably mounted such as being mounted on a vertical slide for ease of maintenance, cleaning and repair when not in operation.

In the most preferred form, suitable provisions are provided for moving support material 16 and food 14 supported thereon relative to printer 130. In a preferred form shown, applicator 122 includes a carrier 132 having a base 134 extending generally parallel to the printing element of printer 130 and in the most preferred form fixed relative to sheeter 12 and cooling tunnel 58. Carrier 132 further includes a moveable platform 136 extending generally parallel to but spaced from base 134 at variable spacings. In the preferred from, platform 136 is maintained parallel to base 134 by use of a parallelogram linkage having first and second, spaced, parallel links 138 of equal length pivotally attached to base 134 and platform 136 at equal spacings. For moving platform 136 relative to base 134, piston/cylinder actuator 140 has a first end pivotally connected to base 134 and a second end pivotally connected to platform 136. As the spacing between the ends of actuator 140 is varied such as by the use of fluid pressure or threadable rotation, links 138 will pivot to move platform 136 relative to base 134.

Carrier 122 according to the preferred teachings includes suitable provisions 142 for detecting if the thickness of food 14 is greater than desired. In the preferred form, provisions 142 are in the form of a photodetector as shown which sends/receives a light beam extending parallel to but spaced from platform 136 and perpendicular to the longitudinal movement direction of support 16 and food 14 supported thereon. Provisions 142 are suitable operably connected to and control actuator 140 for moving platform 136 relative to printer 130.

In its most preferred form, applicator 122 according to the teachings of the present invention includes a human machine interface 144. Specifically, interface 144 allows human intervention to override the detection control such as when servicing or cleaning apparatus 10 and/or to manually adjust operation such as to vary the desired throwback distance according to the type and conditions of food 14 being processed.

Now that the basic construction of apparatus 10 including applicator 122 according to the preferred teachings of the present invention has been explained, preferred modes of operation of apparatus 10 according to the teachings of the present invention can be set forth. Specifically, support material 16 with food 14 supported thereon generally passes from sheeter 12, through applicator 122, and into cooling tunnel 58.

Although printing utilizing rolling type applicators for the support material 16 may have been suggested by U.S. Pat. No. 6,153,233, use of digital imaging printers 130 according to the teachings of the present invention is preferred for several reasons due to real time printing and clarity or resolution (dots per square inch or "DPI"). As indicated previously, real time printing eliminates the need for special roll stock which is made in advance and inventoried. Further, printer 130 according to the preferred teachings of the present invention is capable of printing 100 dots per inch (2.54 cm) laterally across support material 16 and food 14 and even higher resolutions in non-parallel directions and specifically in the perpendicular direction, e.g., 200 DPI or even higher resolutions, e.g. 400 dots per inch (2.54 cm) longitudinally along support material 16 and food 14, which clarity was not possible with rolling type applicators and especially upon food 14. With further advances in the technology of ink jet printing, it is contemplated that even higher resolution images will be possible when such improved printers become available.

However, intermediate moisture products and specifically dried fruit pastes or fruit flavored confections of the type of the present invention have posed problems delaying utilizing digital imaging printers 130 in this field. In particular, installation instructions for the SPECTRA printer 130 utilized in the preferred form suggests the printing elements should be within 0.125 inch (3 mm) from the product surface. However, food 14 of the type of the present invention tends to be sticky and will tend to plug or otherwise foul the printer elements if spaced less than 0.25 inch (6.5 mm) to 0.5 inch (.about.13 mm) therefrom. This is further complicated as food 14 is not homogeneous on support material 16 but can include random irregularities or clumps of greater thickness than the norm such that the top major surface is rough. Thus, food 14 of the present invention has provided a formidable problem to digital image printing.

According to the teachings of the present invention, printing elements of printer 130 are spaced from or have a throw distance of 10 to 25 mm from food 14 and thus in the range of 4 to 6 times greater than the recommended manufacturer's spacing. However, clarity of printing by printer 130 was enhanced for food 14 according to the teachings of the present invention even though contrary to the recommended manufacturer's specifications. One factor in obtaining such surprising results is the temperature at which printing occurs. Particularly, in the preferred form, printing by printer 130 occurs on food 14 while food 14, or at least the top major surface receiving the high resolution image, is at a temperature in the range of 82° C. (180° F. to 190° F.) and most preferably at least about 170° F. (75° C.). In a preferred variation, the edible ink is maintained at a temperature of about 43°-55° C. at printer 130 to facilitate obtaining a high resolution image. In the most preferred form, this is accomplished by placing printer 130 relative to sheeter 12 before cooling tunnel 58 and after sheeter 12 such that heat transfer under ambient conditions does not cool food 14 supported upon support material 16 leaving sheeter 12 below the desired range of the present invention. Likewise, printer 130 must be placed sufficiently upstream of cooling tunnel 58 to prevent air turbulence created thereby from detrimentally affecting printing resolution and/or suitable buffers must be provided between printer 130 and cooling tunnel 58 to reduce turbulence and air flow. While not wishing to be bound by the proposed theory, it is speculated herein that by maintaining food 14 at the temperatures described herein that the surface of food 14 is smooth enough to receive and retain a high resolution image. At other temperatures, while an image can be imparted to the food top major surface, the resolution or quality of the image provided can be inferior. Of course, the particular temperature or temperature range for a food optimal for receipt of a high resolution image can vary with the particular food formulation. What has, in part, been surprisingly discovered herein is the relationship between temperature and the quality or smoothness or porosity of the top major surface of food 14 and the importance of the qualities of the food top major surface to receipt of a high resolution image. More simply, it is not just the capabilities of printer 130 that are important to the finished image, but also the properties of the food product to receive and retain the high resolution image.

In preferred forms, once the image is applied to the top major surface of food 14, the temperature of food 14 with the wet image is maintained for at least 20 seconds at the desired application temperature to allow the ink to dry to provide a dried high resolution image on the food top major surface. At this point, the dried image is "set", and there is less need to preserve the product from insult that can damage or disrupt the image such as forced chilled air cooling. Once the ink has been allowed to dry, food 14 having the dried high resolution image thereupon can be cooled to about 70° to 80° F. (20° to 27° C.) for packaging (such as in a rolled up configuration and disposed within an individual pouch fabricated from a flexible moisture barrier flexible packaging film).

Additionally, carrier 122 according to the teachings of the present invention is particularly advantageous in preventing printer 130 from fouling and plugging and when printing on non-homogenous food 14. Particularly, support material 16 with food 14 supported thereon passes over platform 136. If provisions 142 detect food 14 has a thickness greater than norm, actuator 140 is actuated to move platform 136 downwardly away from printer 130 to prevent food 14 from fouling or plugging printer 130. When provisions 142 do not detect food 14 to have a thickness greater than norm, actuator 140 is actuated to move platform 136 to its normal position. Based upon actual operation, platform 136 is moved downwardly approximately once every 30 seconds. Thus, printer 130 is adjustably maintained to maintain a constant throwback distance.

Now that the basic teachings of the present invention have been explained, many extensions and variations will be obvious to one having ordinary skill in the art. For example, although the methods for fabricating a food item have been disclosed for the fabrication of a food item from a length of food 14 by continuously depositing food 14 on continuous support material 16 in the desired shape in the preferred form by passing between rollers 18 and 20, the length of food 14 could be in other forms according to the preferred teachings of the present invention. As an example, food 14 could be continuous or discontinuous, of a constant or variable shape, of the same material of a homogenous or non-homogenous nature or of different material and the like. Likewise, food 14 could be formed to be self supporting or can be supported in other manners such as by a support mechanism not intended to be included in the final product as sold. Likewise, food 14 could be deposited in other manners according to the teachings of the present invention such as but not limited to placing food 14 upon support material 16 and then shaping food 14 on support material 16 to the desired shape such as by pressing under a press roller.

Likewise, although in the forms discussed applicator 122 is described as providing digital printing of edible ink, it can be appreciated that applicator 122 can provide a topical application of other ingredients if desired according to the teachings of the present invention. As an example, it would be especially desirable to apply vitamins, minerals, and like fortification ingredients as well as flavoring to food 14.

Thereafter, the dried image bearing product can be formed by, and the present methods can optionally include a step of, rolling to form a rolled product and the rolled product so formed disposed within suitable food packaging. For example, an individual item can be placed within a sealed pouch fabricated from a moisture resistant flexible packaging film. Any number (e.g., 6-12) of such pouched items can then be placed within a cardboard carton or other container for distribution and sale.

In still another variation, the food mass is cooled or allowed to cool to below the preferred ink application temperature and then heated (e.g., with radiant heat, hot air, whether forced hot air or air tunnel, or microwave or combinations thereof) such that at least the image receiving surface is heated to a temperature within the preferred ink application temperature.

In a less preferred variation, the image is applied to the food having a receiving surface temperature of less than the preferred ink application temperature but thereafter, preferably immediately thereafter, the image is set using warm air to remove any volatile carrier constituent of the ink such as any alcohol (i.e., to dry). Especially in such an embodiment, it is desirable to control the amount of ink applied so as to not apply too much ink. When excessive ink amounts are applied, then the image can tend to smear and undesirably lose resolution. Excessive ink application, for example, can be observed when the number of image pixels exceed about 500/in$^2$ ($\approx$3225/cm$^2$) when each pixel is formed of a droplet of ~80 picoliter.

In one specific execution, the food product is in the form of a dehydrated fruit material in thin ($\geq$1 mm in thickness) sheet form such as a parallelogram of about 11-12 cm in width and having a 12-13 cm length or a smaller version having a width of, for example, width of about 7-8 cm and a of about 12-13 cm. In still another variation, the image is applied to a similar rolled product in sheet form but having a ribbon configuration such as a width of about 2-4 cm and a length of about 50-100 cm.

In still another variation, inks have recently been developed for ink jet printing for food products in the form of a lak pigment dispersed in a hot wax matrix carrier. These colorants should be useful especially as further development improves their functionality While not wishing to be bound by the proposed theory, it is speculated herein that is important to manage the ink load and temperature control of the food's image receiving surface is one parameter for such management. The image must be dry (i.e., resistant to smearing) prior to the rolling step.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of applying a topical image to a food, comprising:
   moving a length of food in the form of a thin fruit based paste or confection, with the length of food having a top major surface adapted to receive a first topical high resolution image and an opposed bottom major surface, with the length of food having an original color, with the length of food having a shape and an area;
   directly applying the first topical high resolution image on the top major surface of the length of food with a printer arranged spaced from the top major surface by a throwback distance while the length of food is maintained at a temperature of at least about 75° C. (170° F.), with the first topical high resolution image having a resolution of at least 100 dots per inch ("DPI") in at least one direction at the time of application and including at least one edible ink that is different from the original color of the length of food in color or hue; and
   adjustably maintaining the throwback distance substantially constant.

2. The method of claim 1 wherein moving the length of food comprises:
   providing a continuous support material; and
   depositing food on the continuous support material, with the opposed major bottom surface located intermediate the continuous support material and the top major surface, with the first topical high resolution image directly applied on the top major surface after depositing food on the continuous support surface.

3. The method of claim 2 wherein the first topical high resolution image has a higher resolution in a second direction which is not parallel to the first direction.

4. The method of claim 3 wherein the second direction is perpendicular to the first direction, and wherein the higher resolution in the second direction is at least 200 DPI at the time of application.

5. The method of claim 4 wherein applying the first topical high resolution image comprises printing on the top major surface of the length of food with an ink jet printer having at least a first printer head and wherein the edible ink is applied at a temperature exiting the printer head at about 43° to 55° C. (110° to 130° F.).

6. The method of claim 5 wherein the ink jet printer applies the first topical high resolution image including at least two edible inks different in color or hue from each other.

7. The method of claim 6 wherein the ink jet printer applies at least a three color ink color system.

8. The method of claim 5 wherein the throwback distance from the ink jet printer to the top major surface ranges from about 10-25 mm.

9. The method of claim 1 wherein applying the first topical high resolution image includes maintaining the length of food having the first topical high resolution image at a surface temperature of at least 75° C. for at least 20 seconds to dry the edible ink to provide the length of food having a dried high resolution image.

10. The method of claim 9 additionally comprising:
    cooling the length of food having a dried high resolution image to a temperature of about 20° to 27° C. to provide a cooled length of food having the dried high resolution image.

11. The method of claim 5 wherein the ink jet printer further comprises a second printer head in sequence with the first printer head wherein each printer head applies an individually colored edible ink.

12. The method of claim 11 wherein the first printer head applies edible ink selected from the group consisting of cyan, magenta, yellow and black and the second printer head applies a second colored ink.

13. The method of claim 8 wherein the top major surface is smooth enough to receive and retain the first topical high resolution image.

14. The method of claim 9 wherein the first topical high resolution image applied to the top major surface of the length of food is transferable from the length of food to a moist surface.

15. The method of claim 2 wherein depositing the food comprises:
    rotating a first roller in a first direction;
    rotating a second roller in a direction opposite to the first direction;
    passing the continuous support material over the first roller and between the first and second rollers; and
    providing the food intermediate the continuous support material and the second roller.

16. The method of claim 15 wherein providing the food comprises:
    providing the food heated to a temperature to become flowable;
    wherein rotating the second roller comprises rotating the second roller heated to the temperature of the food; and
    wherein the method further comprises cooling the food and support material after the food and support material have been advanced between the first and second rollers.

17. The method of claim 13 further comprising a moveable platform, with the length of food being intermediate the printer head and the moveable platform, with the throwback distance being defined between the top major surface of the length of food and the printer head, with the method further comprising detecting the top major surface of the food on the moveable platform; and moving the moveable platform relative to the printer head according to a detected condition of the top major surface of the length of food.

18. The method of claim 17 wherein detecting the top major surface of the length of food comprises providing a photodetector sending a light beam extending parallel to but spaced from the moveable platform.

19. The method of claim 18 wherein the moveable platform is mounted by a parallelogram linkage to allow movement of the moveable platform between multiple positions parallel to the printer head, with moving the moveable platform comprising pivoting the parallelogram linkage.

20. The method of claim 1 wherein the length of food is supported by and moveable with a platform, said method including moving the platform relative to the printer in response to a spacing of the top major surface of the length of food from the platform.

21. The method of claim 20 further comprising:
detecting the top major surface of the length of food on the platform; and
controlling movement of the platform relative to the printer.

22. The method of claim 21, further comprising: transmitting a light beam in detecting the top major surface.

23. The method of claim 22, wherein the light beam is transmitted parallel to but spaced from the platform and perpendicular to a direction of movement of the length of food.

24. The method of claim 21 further comprising: maintaining the platform parallel to the printer, independent of the throwback distance.

25. The method of claim 24, wherein the platform is mounted on a parallelogram linkage, and wherein maintaining the platform parallel to the printer includes adjusting the parallelogram linkage.

26. The method of claim 24, further comprising: expanding or contracting an actuator to move the platform relative to the printer.

* * * * *